United States Patent
Khare

(10) Patent No.: US 10,066,473 B2
(45) Date of Patent: Sep. 4, 2018

(54) METHOD AND A SYSTEM FOR DETERMINING SLIP STATUS OF A DRILL STRING

(71) Applicant: Wipro Limited, Bangalore (IN)

(72) Inventor: Sunil Kumar Khare, Greater Noida (IN)

(73) Assignee: Wipro Limited, Bangalore (IN)

(*) Notice: Subject to any disclaimer, the term of this patent is extended or adjusted under 35 U.S.C. 154(b) by 128 days.

(21) Appl. No.: 15/246,227

(22) Filed: Aug. 24, 2016

(65) Prior Publication Data

US 2018/0003024 A1   Jan. 4, 2018

(30) Foreign Application Priority Data

Jun. 30, 2016   (IN) .............................. 201641022580

(51) Int. Cl.
*E21B 44/00* (2006.01)
*E21B 47/00* (2012.01)
*G05B 23/02* (2006.01)

(52) U.S. Cl.
CPC .......... *E21B 44/00* (2013.01); *E21B 47/0006* (2013.01); *G05B 23/0208* (2013.01); *G05B 2219/45129* (2013.01)

(58) Field of Classification Search
CPC ...... E21B 44/00; E21B 47/00; E21B 47/0006; G05B 23/02; G05B 23/08; G05B 2219/45129; G05B 23/0208
See application file for complete search history.

(56) References Cited

U.S. PATENT DOCUMENTS

| 4,794,534 A | 12/1988 | Millheim |
| 4,976,143 A | 12/1990 | Casso |

(Continued)

FOREIGN PATENT DOCUMENTS

| EP | 0 449 710 | 3/1991 |
| WO | WO 2014/160561 | 10/2014 |

OTHER PUBLICATIONS

Extended European Search Report from the European Patent Office in counterpart European Application No. 16191715.8 dated Apr. 28, 2017, 9 pages.

(Continued)

*Primary Examiner* — Bryan Bui
(74) *Attorney, Agent, or Firm* — Finnegan, Henderson, Farabow, Garrett & Dunner LLP

(57) ABSTRACT

The monitoring and control system is configured to obtain a hook load data at predetermined time intervals, and determine variation of hook load between the predetermined time intervals using the hook load data obtained. The monitoring and control system further determines a slip status of a drill string corresponding to each of the variation of hook load. The slip status is determined by comparing each of the variation of hook load with a threshold value of noise. The threshold value of noise is determined based on predetermined parameters of the drill string. The slip status of the drill string corresponding to each of the variation of hook load may be verified based on one or more predetermined conditions. The slip status of the drill string corresponding to each of the variation of hook load may be corrected by adjusting predetermined parameters, based on verification of one or more predetermined conditions.

14 Claims, 5 Drawing Sheets

(56) References Cited

U.S. PATENT DOCUMENTS

| | | | |
|---|---|---|---|
| 6,892,812 | B2 | 5/2005 | Niedermayr et al. |
| 7,128,167 | B2 | 10/2006 | Dunlop et al. |
| 7,142,986 | B2 | 11/2006 | Moran |
| 7,845,420 | B1* | 12/2010 | Borgstadt ............... B25J 9/1664 |
| | | | 166/250.01 |
| 2011/0166789 | A1 | 7/2011 | Barrow et al. |
| 2013/0124096 | A1 | 5/2013 | Du Castel et al. |
| 2017/0145805 | A1* | 5/2017 | Tharaldsen ............. E21B 21/08 |

OTHER PUBLICATIONS

Catheryn Staveley et al, "Increasing Drilling Efficiencies Through Improved Collaboration and Analysis of Real-Time and Historical Drilling Date", 2010, *Society of Petroleum Engineers*, Abstract, 2 pages.

Fred E. Dupriest et al, "Maximizing ROP with Real-Time Analysis of Digital Data and MSE", 2005, *International Petroleum Technology Conference*, Abstract, 2 pages.

Chris Rhodes, "Intelligent Planning Reduces Nonproductive Drilling time", *Oilfield Review, Schlumberger*, 2001, 2 pages.

Odd Erik Gundersen et al, "A Real-Time Decision Support System for High Cost Oil Well Drilling Operations", *Association for the Advancement of Artificial Intelligence*, 2013, pp. 21-32.

Bart E. Vos et al, "The Benefits of Monitoring Torque & Drag in Real Time", 2000, *Society of Petroleum Engineers*, Abstract, 2 pages.

Ketil Andersen et al, "Case History: Automated Performance Measurement of Crews and Drilling Equipment", 2009, *Society of Petroleum Engineers*, Abstract, 2 pages.

L. Saputelli et al, "Real-Time Decison-making for Value Creation while Drilling", 2003, *Society of Petroleum Engineers*, Abstract, 2 pages.

Roni Absensur Gandelman et al, "Real-Time Drilling Data Analysis: Building Blocks for the Definition of a Problem Anticipation Methodology", 2010, *Society of Petroleum Engineers*, Abstract, 2 pages.

John Cochener, "Quantifying Drilling Efficiency". Jun. 28, 2010, *U.S. Energy Information Administration*, 16 pages.

Sameh El Afifi et al, "Enhance the Drilling & Tripping Performance on Automated Rigs with fully automated performance measurement", 2015, *Society of Petroleum Engineers*, Abstract, 3 pages.

WorldOil, "Real-Time Rig-Activity Detection Helps Identify and Minimize Invisibie Lost Time", https://protect-us.mimecast.com/s/pVqWBdhunlXfL, 1 page.

G. Thonhauser, "Using Real-Time Data for Automated Drilling Performance Analysis", Apr. 2004, *Oil Gas European Magazine*, pp. OG170-OG173.

Edvin Kristensen, "Model of Hook Load During Tripping Operation", Jun. 2013, *Norwegian University of Science and Technology*, 84 pages.

Abu Hu, "Instrumentation catalog 2016. NOV Wellbore DDS", Dec. 28, 2016, https://protect-us.mimecast.com/s/LLO2BaUooJbSm, 11 pages.

* cited by examiner

METHOD AND A SYSTEM FOR DETERMINING SLIP STATUS OF A DRILL STRING

TECHNICAL FIELD

The present disclosure generally relates to field of oil and gas. Particularly, but not exclusively the present disclosure relates to a method and a system for controlling drilling operation in oil and gas rigs. Further embodiments of the present disclosure disclose a method and system for determining slip status of drill string for efficient control of the drilling operation.

BACKGROUND

In oilfield operations, drilling process may be impeded by a wide variety of problems. An accurate measurement of downhole conditions, rock properties and surface equipment enables many drilling risks to be minimized and thereby improves operational efficiency of the drill rig.

It is observed that for efficient drilling of oil and gas wells, it is essential to generate reliable and accurate real-time operation monitoring data at the rig-site. The cost reduction in drilling of oil and gas wells and improvement of operational efficiency of the drill rig is achieved by reducing non-productive time.

Conventionally non-productive time of the drill rig is monitored and controlled by measuring real time variables e.g. bit depth, bore hole depth, true vertical depth and bit on bottom status. Reliable and precise measurement of real time variables enables better quantification and measurement of drilling performance. The existing technologies also describe a method of automated drilling performance analysis from real time data. Since bit depth, bore hole depth, true vertical depth and bit on bottom status determination depend on slip status value of the drill string, reliable and precise determination of slip status enables minimizing non-productive time and maximizing drilling performance and hence drilling operational efficiency.

Further, operational efficiency may also be improved by faster footage drilling per hour. The drilling performance key performance indicators (KPI) are derived from drilling operational data and help in drilling operational efficiency measurements and improvements. Tripping rate KPI is determined from bit depth and stand counter change rates while running in and pulling out of drill pipes. Casing run rate KPI is also determined from bit depth and stand counter change rates while running in casing joints. Bit Depth and Stand Counter change are determined from Slip Status as a primary parameter. Hence, accurate measurement and better control of tripping rate largely depends on reliable and precise values of slip status of the drill string. Therefore, it may be understood that drilling operational efficiency depends on reliable and precise values of slip status.

Some of the conventional technologies also suggest drilling operational efficiency improvement by effective collaboration between Rig-system and real time operational centre system (RTOC). Reliable and precise values of slip status enable good quality drilling operational data. This data is transmitted in real time from rig system to town based RTOC system where experienced engineers provide critical real time remote decision support to drilling operations. RTOC system also supports workflows and applications which can predict drilling hazards prior to happening of event and suggest timely mitigation methods to rig team. Therefore, it can be concluded that reliable and precise slip status values enable effective collaboration and improved drilling operational efficiency.

In light of the above it may be understood that improvements in operational efficiency of the drill rig can be achieved by reliable and accurate measurement of slip status. Generally, determination of slip status (SST) depends on quality of available real-time hook load (RTHL) data and the hook load threshold (Pre-configured value of Threshold HL-PCTHL). The conventional method which is widely followed for determination of SST is based on PCTHL. In such conventional methods of SST determination, PCTHL is static, manual and based on individual judgement. This approach is usually error prone and likely to lead to incorrect PCTHL specification that result in unreliable and inaccurate SST determination. Also, in practical drilling operation, the PCTHL value may need to be specified according to the changing values of hook load, hook speed and hook movement etc. This mechanism fails to provide accurate determination of SST at the beginning, end of trip and at beginning of casing run job when string weight is low. This leads to inaccurate determination of bit depth and stand counter values at beginning of and end of trips and beginning of casing job. In the absence of automated accurate slip status measurement mechanism at beginning and end of trips, real time drilling operational data e.g. bore hole depth, bit depth, true vertical depth, bit on bottom and stand counter cannot be determined accurately, adversely affecting operations monitoring and drilling operational efficiency measurement and improvement.

In light of the foregoing discussion, there is a need to develop an improved method for determining accurate slip status of the drill string to overcome one or more limitations stated above.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

In one non limiting embodiment of the disclosure, there is provided a method for determining slip status of a drill string. The method comprising act of obtaining, by a monitoring and control system, a hook load data at predetermined time intervals. Subsequently, the method comprises acts of determining, by the monitoring and control system, variation of hook load between the predetermined time intervals using the hook load data. The method further involves act of determining, by the monitoring and control system, a slip status of the drill string corresponding to each of the variation of hook load by comparing each of the variation of hook load with a threshold value of noise in the drill string. The threshold value of noise in the drill string is determined based on predetermined parameters of the drill string.

In an embodiment of the disclosure, the method further comprises step of verifying, by the monitoring and control system, the slip status of the drill string corresponding to each of the variation of hook load using one or more predetermined conditions. The one or more pre-determined conditions include slip status toggle condition, high threshold value of noise while releasing drill string from slips, high threshold value of noise while putting drill string on slips, low threshold value of noise while tripping, bit is on bottom of borehole, bit is on surface, and over pull due to stuck pipe and pack off conditions.

In an embodiment of the disclosure, the method further comprises act of correcting, by the monitoring and control system, the slip status of the drill string corresponding to each of the variation of hook load by adjusting predetermined parameters, based on verification of the one or more predetermined conditions. Further, adjusting of the predetermined parameters includes act of computing the one or more correction factors, and then computing the predetermined parameters using the one or more correction factors.

In an embodiment of the disclosure, the hook load data and the predetermined parameters are stored in a data acquisition module. The predetermined parameters include drill collar stand weight, data recording time interval, drill collar stand weight factor and data recording time interval factor.

In an embodiment of the disclosure, the slip status is a value indicating at least one of in slip and out of slip condition of the drill string.

In an embodiment of the disclosure, the variation of hook load is determined, based on the hook load data obtained at current time interval of the predetermined time intervals and the hook load data obtained at previous time interval of the predetermined time intervals.

In an embodiment of the disclosure, the slip status of the drill string corresponding to each of the variation of hook load is determined by comparing magnitude and direction of each of the variation of hook load with the threshold value of noise.

In one non-limiting embodiment of the disclosure, a monitoring and control system for determining slip status of a drill string is disclosed. The monitoring and control system comprises a processor and a memory communicatively coupled to the processor. The memory stores the processor-executable instruction, which, on execution, causes the processor to obtain a hook load data at predetermined time intervals, determine variation of hook load between the predetermined time intervals using the hook load data and determine a slip status of the drill string corresponding to each of the variation of hook load by comparing each of the variation of hook load with a threshold value of noise. The threshold value of noise in the drill string is determined based on predetermined parameters of the drill string.

In an embodiment of the disclosure, the processor is further configured to verify the slip status of the drill string corresponding to each of the variation of hook load based on one or more predetermined conditions and correct the slip status of the drill string corresponding to each of the variation of hook load by adjusting predetermined parameters, based on verification of one or more predetermined conditions.

In an embodiment of the disclosure, the monitoring and control system is communicatively coupled to a data acquisition module associated with one or more sensors on the drill string.

In an embodiment of the disclosure, the data acquisition module is configured to convert electronic signals received from the plurality of sensors into digital signals.

In another embodiment, a non-transitory computer-readable storage medium for determining slip status of a drill string is disclosed, which when executed by a computing device, cause the computing device to perform operations comprising obtaining a hook load data at predetermined time intervals. The operations further comprising determining variation of hook load between the predetermined time intervals using the hook load data, and the operations still further comprising determining a slip status of the drill string corresponding to each of the variation of hook load by comparing each of the variation of hook load with a threshold value of noise in the drill string, wherein the threshold value of noise in the drill string is determined based on predetermined parameters of the drill string.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
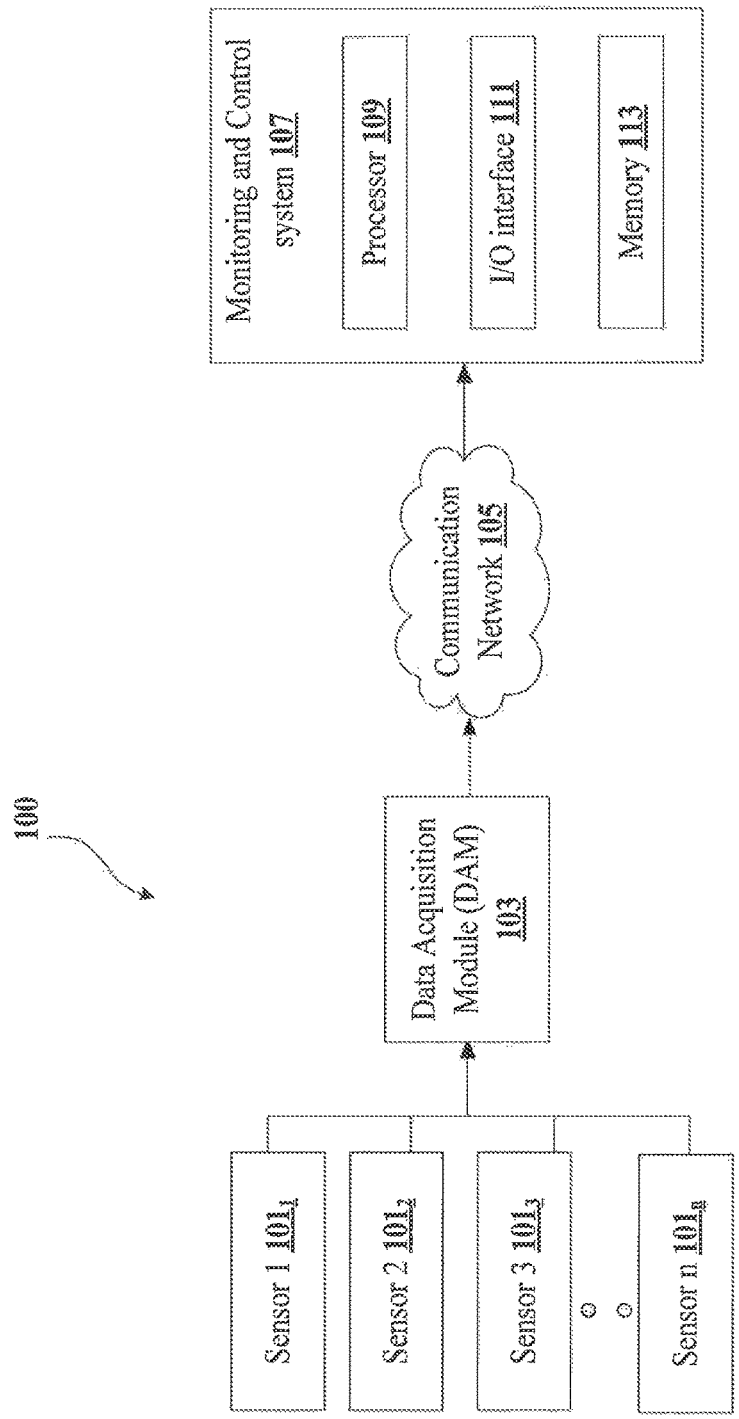
FIG. 1 illustrates an exemplary architecture of a system for determining slip status of a drill string, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

To overcome one or more limitations in the background, the present disclosure discloses to a method and a system for determining slip status of a drill string. The system used, to determine the slip status of the drill string is herein referred to as a monitoring and control system. The monitoring and control system of the present disclosure assists in accurate determination of the slip status of the drill string, which enables improvement in drilling operation efficiency.

The term slip status used herein above and below refers to a state of drill string, either 'in slip'—wherein slips of a drill rig bears the load of the drill string or 'out of slip'—wherein hook of the drill rig bears the load of the drill string.

The monitoring and control system also referred as system to determine slip status of the drill string of the present disclosure includes a processor and a memory communicatively coupled to the processor. The system is implemented with a method to determine slip status of the drill string using real time drilling operational parameters. The monitoring and control system is configured to obtain real time drilling operational data such as hook load data from one or more sensors configured on the drill string to determine slip status based on variation of hook load. The real time data is obtained by the monitoring and control system through a data acquisition module which converts electronic signals received from the one or more sensors into digital signals. The monitoring and control system uses the data stored in data acquisition module to determine variation of hook load at regular time intervals. The variation of hook load also referred to as temporal variation of hook load which is determined by computing difference of the real time hook load data obtained at current time interval and the real time hook load data obtained at previous time interval by the monitoring and control system. Further to the determination of temporal variation of hook load, a plot of temporal variation of hook load and time is plotted for a trip in or trip out job. The plot depicts the magnitude of temporal variation of hook load against time, where magnitude beyond a certain extent indicates spike and is noise otherwise. This noise in the hook load variation data is to be eliminated for better accuracy of the slip status. Therefore, in order to eliminate the noise, and to subsequently determine the slip status of the drill string, threshold value of noise is computed. The threshold value of noise is computed using pre-determined rig specific parameters. Once the threshold value of noise is determined, the monitoring and control system determines the slip status of the drill string by comparing the threshold value of noise with the magnitude of the temporal variation of hook load In an embodiment, direction of temporal variation of hook load spike determines direction of slip status change, a positive spike indicates in to out of slip state and negative spike indicates out to in slip state.

The monitoring and control system implemented with a method as described in forthcoming paragraphs largely improves accuracy of determination of slip status by filtering out the noise component of the determined temporal variation of hook load. To further improve the accuracy, the slip status determined is verified using pre-determined conditions. Based on verification, the correction factor for pre-determined conditions is computed to correct the pre-determined rig specific parameters and accordingly compute threshold value of noise to enable better filtering of temporal value of hook load spikes from the temporal variation of hook load noise.

The method of the present disclosure thus enables accurate determination of slip status of the drill string during high load operations, at the end of trip out job or at the beginning of trip in job. It also enables accurate determination of bit depth and other critical drilling parameters, thereby improves operational efficiency of the drill rig.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture 100 of the system used for determining slip status of a drill string, in accordance with some embodiments of the present disclosure.

The architecture 100 comprises one or more sensors, sensor 1 $101_1$ to sensor n $101_n$ (collectively referred to as one or more sensors 101), a data acquisition module 103, a communication network 105 and a monitoring and control system 107.

The architecture 100 is used for determining slip status of a drill string [not shown] specific to a drill rig. In an embodiment, the drill rig is a machine used to drill wellbore in oil fields and major components of the drill rig [not shown] include mast, rotary table, drill string, power generation equipment and auxiliary equipment. The drill string of the drill rig is made up of combination of drill pipe, bottom hole assembly and other tool to make the drill bit turn. In an embodiment of the disclosure, one or more sensors 101 are installed on the drill string. The one or more sensors 101 are configured to sense and generate electronic signals in real time. In an embodiment of the disclosure, the electronic signals generated by the one or more sensors 101 relate to hook load and other real time drilling operational parameters. The other real time drilling operational parameters include but are not limited to stand pipe pressure, mud flow rate, block height, string rotation rate etc. In an embodiment, the hook load data which is crucial for determination of slip status of the drill string is generated by a hook load data sensor. The hook load is defined as sum of vertical components of the forces acting on the hook and includes total force due to weight of hook itself and attached drill pipe and bottom-hole assembly.

The architecture 100 further depicts data acquisition module (DAM) 103, the data acquisition module 103 is interfaced with the one or more sensors (101), and is configured to receive the electronic signals generated by the one or more sensors 101 through a signal conditioning panel (not shown). The data acquisition module 103 is a sub system at the rig site which creates digital data from the electronic signals generated by the one or more sensors 101. The data acquisition module 103 thus generates and stores real time digital hook load and other drilling data. The data acquisition module 103 also stores related calibrations and thus real time values are generated in the data acquisition module 103. These values are then transmitted to the monitoring and control system 107 for storage, computations and workflow support through a communication network 105.

The monitoring and control system 107 comprises a processor 109, an I/O interface 111 and a memory 113. The I/O interface 111 is configured to receive the values transmitted from the data acquisition module 103 through the communication network 105. The values transmitted to the I/O interface 111 by the data acquisition module 103 includes but are not limited to hook load, real time predetermined values such as stand pipe pressure, mud flow rate, block height, string rotation rate etc. The values transmitted to the monitoring and control system 107 is stored in the memory 113. The processor 109 of the monitoring and control system 107 determines slip status of the drill string based on the signals received from the one or more sensors 101.

In an embodiment, the processor 109, among other data obtains hook load data from the memory 113. The hook load data is initially sensed by the hook load sensor installed on the drill rig which generates electronic signals and is stored in the data acquisition module 103 in the form of digital data. This hook load data is obtained and processed by the processor 109 at regular predetermined time intervals. In an embodiment of the disclosure, the predetermined time interval ranges from 0.5 seconds to 5 seconds. Once the processor 109 obtains the hook load data, it determines the variation of hook load or temporal variation of hook load in this predetermined time interval. The temporal variation of hook load is determined by computing the difference of hook load obtained at current time and the hook load obtained at previous time divided by time interval between the current time and the previous time. The processor 109 then determines threshold value of noise by utilizing rig specific predetermined parameters stored in the memory 113 of monitoring and control system 107 or in the data acquisition module 103. The processor 109 upon determining the threshold value of noise determines the slip status of the drill string as to whether the drill string is to be in the slips or out of slips to improve the drilling operational efficiency. The slip status corresponding to each of the temporal variation of hook load is determined by comparing the magnitude and direction of variation of hook load with the threshold value of noise.

Figure 2:
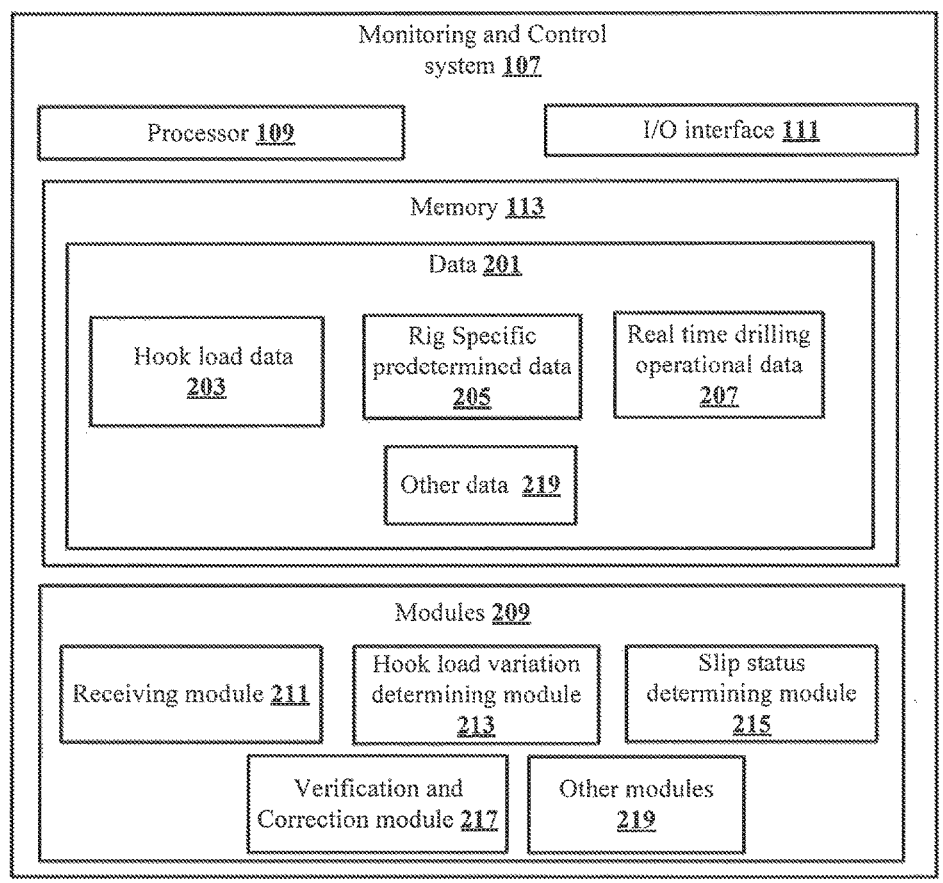
FIG. 2 illustrates a detailed block diagram of a monitoring and control system for determining slip status of the drill string, in accordance with some embodiments of the present disclosure.

Referring now to FIG. 2, it illustrates a detailed block diagram of a monitoring and control system 107 for determining slip status of a drill string, in accordance with some embodiments of the present disclosure.

In one implementation, the I/O interface 111 in the monitoring and control system 107, receives inputs from one or more sensors 103. The inputs received from the one or more sensors 101 is stored in a memory 113 configured in the monitoring and control system 107. The inputs are stored in the form of a data 201. In one embodiment, the data 201 of the monitoring and control system 107 includes hook load data 203, rig specific predetermined data 205 and other real time drilling operational data 207. In the illustrated FIG. 2, data 201 stored in the memory 113 are described herein in detail.

In one embodiment, the data 201 may be stored in the memory 113 in the form of various data structures. Additionally, the aforementioned data can be organized using data models, such as relational or hierarchical data models. The other data 219 may store data, including temporary data and temporary files, generated by modules 209 for performing the various functions of the monitoring and control system 107.

In one embodiment, the hook load data 203 is generated by the hook load sensor of one or more sensors 103. The hook load data generated is in the form of electronic signals and this signal is interpreted and converted into digital signal by the data acquisition module 103. The data acquisition module 103 further transmits this digital signal to the memory 113 of the monitoring and control system 107. The hook load as described in the previous paragraphs is the sum of vertical components of the forces acting on the hook and includes total force due to weight of hook itself and attached drill pipe and bottom hole assembly.

In one embodiment, the rig specific predetermined data 205 is generated by the one or more sensors 101 installed on the drill string of the drill rig. The rig specific predetermined data 205 includes drill collar stand weight, data recording time interval, spike limit and the related factors like drill collar stand weight factor, data recording time interval factor. The one or more sensors 101 upon sensing this data transmits electronic signals to the data acquisition module 103, which converts these into digital signals. The rig specific predetermined data 205 is subsequently transmitted to the memory 113 of the monitoring and control system 107 which is accessible by the processor 109. These predetermined data are specific for a particular drill rig and varies from rig to rig.

In an embodiment, the real time drilling operational data 207 is generated by the one or more sensors 101. The real time drilling operational data 207 includes but is not limited to bit depth, true vertical depth, stand counter, borehole depth, bit on bottom and rate of penetration. The real time drilling operational data 207 are generated and computed from sensor signals and calibrated in the data acquisition module 103 which is further transmitted to the memory 113 of the monitoring and control system 107.

In an embodiment, the data stored in the memory 113 is processed by the modules 209 of the monitoring and control system 107. The modules 209 may be stored within the memory 113. In an example, the modules 209, communicatively coupled to a processor 109 configured in the monitoring and control system 107, may also be present outside the memory 113 as shown in FIG. 2 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 209 may include, for example, a receiving module 211, hook load variation determining module 213, slip status determining module 215, verification and correction module 217 and other modules 219. The other modules 219 may be used to perform various miscellaneous functionalities of the monitoring and control system 107. It will be appreciated that such aforementioned modules 209 may be represented as a single module or a combination of different modules.

In an embodiment, the receiving module 211 receives the data from the one or more sensors 101 which is configured to generate electronic signals. As an example, the data from one or more sensors 101 may include, but not limited to, hook load data, real time drilling operational data like bit depth, rate of penetration, true vertical depth, stand counter etc and rig specific pre-determined parameters like drill collar stand weight, drill collar stand weight factor, data recording time interval and data recording time interval factor.

In an embodiment, the hook load variation determining module 213 is configured to obtain the hook load data form the hook load sensor of the one or more sensors 101. The hook load sensor generates the electronic signals related to hook load data. These electronic signals of the hook load sensor are acquired by the data acquisition module 103 and it converts the electronic signals into digital signals. In an embodiment, the digital signals are transmitted to the memory 113 of the monitoring and control system 107. The hook load determining module 213 then obtains real time hook load data from the memory 113 at regular predetermined time intervals.

Further, the hook load variation determining module 213 determines variation of hook load or temporal variation of hook load between the predetermined time intervals at which the real time hook load data is obtained. The temporal variation of hook load (TVHL) or variation of hook load is determined by computing the difference of real time hook load data obtained at current time interval to the real time hook load data obtained at previous time interval. It is determined as shown below—

$$TVHL = dHL/dT = (RTHL - PVHL)/(T2 - T1)$$

Where TVHL=Temporal variation of hook load
RTHL=Real time hook load value at T2
PVHL=Real time hook load value at T1
T2=Time stamp of current record
T1=Time stamp of previous record Therefore, the temporal variation of hook load or variation of hook load is the ratio of difference of hook load values to that of the difference of time stamp of current record and previous record.

In an embodiment, the slip status determining module 215 is configured to determine the slip status of the drill string. To determine slip status, a parameter-threshold value of noise is determined. The threshold value of noise is determined using predetermined rig specific parameters, these rig specific predetermined parameters include drill collar stand weight (DCSW), data recoding Data Recording Time Interval (DRTI), SL (Spike Limit) and the related factors like Drill collar stand weight Factor (DCSWF), Data Recording Time Interval Factor (DRTIF), etc. from the DAM.

The Threshold value of noise (TVN) is determined by—

$$TVN = (DCSW \ast DCSWF)/(DRTI \ast DRTIF)$$

For DCSWF=1 and DRTIF=1

$$TVN = DCSW/DRTI$$

Therefore, for one second data records, $$TVN = DCSW$$

Furthermore, for a specific rig R1, the slip status (SST) determining module 215 identifies noise/spike component in temporal variation of hook load (TVHL) value and accordingly determines slip status of the drill string by assigning SST a certain value, for example '1' indicating out of slips and '2' indicating in the slips. The following steps are carried out to determine SST—

$MTVHL_1$=Magnitude $(TVHL_1)$
$DTVHL_1$=Direction $(TVHL_1)$ positive or negative
If $(MTVHL_1) \geq TVN_1$
  Then $TVHL_1$=spike
    If $DTVHL_1 > 0$
      $TVHL_1 = 1$
      $SST_1 = 1$
    ELSE If $DTVHL_1 < 0$
      $TVHL_1 = 2$
      $SST_1 = 2$
  Else $TVHL_1$=Noise
    $TVHL_1 = 0$
    $SST_1 = SST_0$ Where $TVHL_1$ and $SST_1$ are the current values of TVHL and SST for rig $R_1$. The $TVN_1$ is the TVN value for $R_1$ and $SST_0$ is SST value of previous record.

This way, slip status (SST) for each temporal variation of hook load spike or noise is determined by the slip status determining module 215 and noise component of TVHL due to hook movement is filtered out.

The memory 113 of the monitoring and control system 107 then stores adjusted value of $TVHL_1$ and $SST_1$ in its persistent store.

In a similar way, TVN for multiple rigs and for their multiple data recording intervals can be obtained.

In an embodiment, the verification and correction module 217 assesses the accuracy of slip status for verification and performs adjustment to predetermined parameter of the drill rig configuration following the steps below in order to achieve better accuracy of the slip status determined—

The verification and correction module 217 checks ((SST-1==SST1) AND (SST1!=SST0)) for detecting a SST-toggle condition.

In case of a SST-toggle condition, the verification and correction module 217 adjusts the Drill Collar Stand Weight Factor (DCSWF) as below—

$$\alpha = MTVHL1 - TVN1$$

$$DCSWF(new) = DCSWF(old) + \alpha$$

where α represents correction to the Drill Collar Weight under SST-toggle condition.

In an embodiment, the verification and correction module 217, checks if value of previous to previous slip status (SST-1) is equal to current value of slip status (SST1) and if value of current slip status (SST1) is not equal to previous value of slip status (SST0). If this condition fails then the slip status correction is not required. If the condition is satisfied, then this is identified as the SST-toggle condition, in which case, a correction factor α is computed. In an embodiment, α is difference of magnitude of temporal variation of hook load (MTVHL1) and threshold value of noise (TVN) of current record. Further, a new value of the predetermined parameter of the drill rig DCSWF (new) is computed using the correction factor α. The DCSWF (new) so obtained is further used to recompute threshold value of noise, which enables better filtering of hook load spikes from the hook load noise. With this value a correct slip status can be determined.

If ((HL1-HL0>DCSW) AND (RTHH1>RTHH0) AND (SST1==SST0==2))—this implies MTVHL<TVN which needs correction.

$$\beta = TVN1 - MTVHL1$$

$$DCSWF(new) = DCSWF(old) - \beta$$

Where β represents correction to the Drill Collar Stand Weight under high TVN while releasing string from slips.

In an embodiment, the verification and correction module 217, checks if current hook load (HL1) is more than previous hook load (HL0) by a drill collar stand weight (DCSW)

and if current hook height (RTHH1) is greater than previous hook height (RTHH0) and if current slip status (SS1) is equal to previous slip status (SST0). If this condition fails then the slip status correction is not required. If the condition is satisfied, then this is identified as the high TVN while releasing string from slips, in which case, a correction factor β is computed. In an embodiment, β is difference of threshold value of noise (TVN) and magnitude of temporal variation of hook load (MTVHL1) of current record. Further, a new value of the predetermined parameter of the drill rig DCSWF (new) is computed using the correction factor β where DCSWF (new) is difference of DCSWF (old) and β. The DCSWF (new) so obtained is further used to recompute threshold value of noise, which enables better filtering of hook load spikes from the hook load noise. With this value a correct slip status can be determined.

If ((HL0−HL1>DCSW) AND (RTHH1<RTHH0) AND (SST1==SST0=1))—This implies MTVHL<TVN which needs correction.

$$\gamma = TVN1 - MTVHL1$$

$$DCSWF(new) = DCSWF(old) - \gamma$$

where γ represents correction to the Drill Collar Weight under high TVN while putting string on slips.

In an embodiment, the verification and correction module 217, checks if previous hook load (HL0) is greater than current hook load (HL1) by a drill collar stand weight (DCSW) and if current hook height (RTHH1) is lesser than previous hook height (RTHH0) and if current slip status (SS1) is equal to previous slip status (SST0). If this condition fails then the slip status correction is not required. If the condition is satisfied, then this is identified as the high TVN while putting string in slips, in which case, a correction factor γ is computed. In an embodiment, γ is difference of threshold value of noise (TVN) and magnitude of temporal variation of hook load (MTVHL1) of current record. Further, a new value of the predetermined parameter of the drill rig DCSWF (new) is computed using the correction factor γ where DCSWF (new) is difference of DCSWF (old) and γ. The DCSWF (new) so obtained is further used to recompute threshold value of noise, which enables better filtering of hook load spikes from the hook load noise. With this value a correct slip status can be determined.

If ((TVHL1=spike) and (TVHL0=spike) and (DTVHL1==! DTVHL0))—then TVN needs correction else SST detection is likely to be incorrect;

$$\delta = \min(MTVHL1, MTVHL0) - TVN1$$

$$DCSWF(new) = DCSWF(old) + \delta$$

where δ represents correction to the Drill Collar Weight under low TVN while tripping.

In an embodiment, the verification and correction module 217, checks if value of current temporal variation of hook load (TVHL1) is spike and if value of previous temporal variation of hook load (TVHL0) is spike and if current direction of temporal variation of hook load (DTVHL1) is equal to previous direction of temporal variation of hook load (DTVHL0). If this condition fails then the slip status correction is not required. If the condition is satisfied, then this is identified as low TVN while tripping, in which case, a correction factor δ is computed. In an embodiment, δ is difference of minimum value of—current magnitude of temporal variation of hook load (MTVHL1) and previous magnitude of temporal variation of hook load (MTVHL0), and threshold value of noise (TVN). Further, a new value of the predetermined parameter of the drill rig DCSWF (new) is computed using the correction factor δ where DCSWF (new) is DCSWF (old) plus δ. The DCSWF (new) so obtained is further used to recompute threshold value of noise, which enables better filtering of hook load spikes from the hook load noise. With this value a correct slip status can be determined.

If((BD=BHD) and (SST=2))—SST detection is likely to be incorrect;

$$\varepsilon = TVN1 - MTVHL1$$

$$DCSWF(new) = DCSWF(old) - \varepsilon$$

where ε represents correction to the Drill Collar Weight when in slip status obtained while bit is on bottom of borehole.

In an embodiment, the verification and correction module 217, checks if bit depth (BD) is equal to bore hole depth (BHD) and if value of slip status is equal to 2 (in slips). If this condition fails then the slip status correction is not required. If the condition is satisfied, then this is identified as condition where bit is in slip at bottom of borehole, in which case, a correction factor ε is computed. In an embodiment, ε is difference of threshold value of noise (TVN1) and magnitude of temporal variation of hook load (MTVHL1) of current record. Further, a new value of the predetermined parameter of the drill rig DCSWF (new) is computed using the correction factor ε where DCSWF (new) is difference DCSWF (old) and ε. The DCSWF (new) so obtained is further used to recompute threshold value of noise, which enables better filtering of hook load spikes from the hook load noise. With this value a correct slip status can be determined.

If ((BD=0) and (SST=1))—SST detection is likely to be incorrect;

$$\eta = MTVHL1 - TVN1$$

$$DCSWF(new) = DCSWF(old) + \eta$$

where η represents correction to the Drill Collar Weight when out of slip status obtained while bit is on surface.

In an embodiment, the verification and correction module 217, checks if bit depth (BD) is equal to zero and if value of slip status is equal to 1 (out of slips). If this condition fails then the slip status correction is not required. If the condition is satisfied, then this is identified as condition where slip status is out of slip when bit is on surface, in which case, a correction factor η is computed. In an embodiment, η is difference of magnitude of temporal variation of hook load (MTVHL1) of current record and threshold value of noise (TVN1). Further, a new value of the predetermined parameter of the drill rig DCSWF (new) is computed using the correction factor η where DCSWF (new) is DCSWF (old) plus η. The DCSWF (new) so obtained is further used to recompute threshold value of noise, which enables better filtering of hook load spikes from the hook load noise. With this value a correct slip status can be determined.

If(MTVHL1>SL)—SST detection is likely to be incorrect;

Here SL=100*DCSW

Then SST1=SST0

TVHL spikes in this scenario are obtained due to signal spike or over pull due to stuck pipe, pack off conditions.

In an embodiment, the verification and correction module 217, checks if current value magnitude of temporal variation of hook load (MTVHL1) is greater than spike limit (SL). If the condition is satisfied, then this is identified as condition of signal spike or over pull due to stuck pipe, pack off conditions, in which case, no changes are made to the value of slip status (SST).

The memory 113 of the monitoring and control system 107 then stores the new set of rig specific predetermined parameters into its own persistence store and sends these to data acquisition module as well. Thus the verification and correction module 217 verifies the slip status of the drill string and is corrected based on the verification by using appropriate correction factors. This provides accurate values of slip status of the drill string based on variation of the hook load data in real time.

Figure 3:
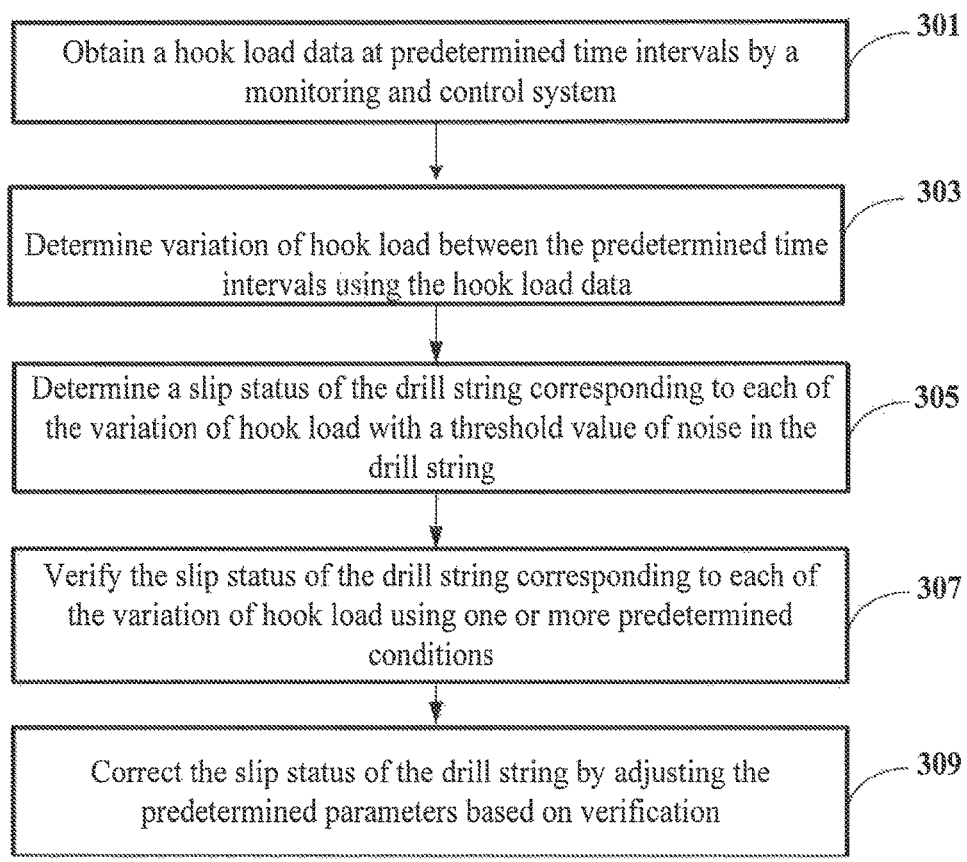
FIG. 3 illustrates a flowchart depicting the various steps involved for determining slip status of the drill string, in accordance with some embodiments of the present disclosure.

Referring now to FIG. 3, it illustrates a flowchart for determining slip status of a drill string, in accordance with some embodiments of the present disclosure.

As illustrated in FIG. 3, the method 300 comprises one or more blocks illustrating a method for determining slip status of the drill string. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the monitoring and control system 107 is configured to obtain hook load data. The hook load data is dynamically obtained i.e. real time data of the hook load is obtained. These data of hook load is obtained at regular predetermined time intervals. The hook load data is initially sensed by a hook load sensor of the one or more sensors 101. The hook load sensor is installed on the drill string of the drill rig. The sensor generates electronic signals of the hook load sensed and transmits it to the data acquisition module 103, which converts these electronic signals into digital signal. The data acquisition module 103 generates and stores related calibrations of the hook load. These calibrations are transmitted to the monitoring and control system 107 for storage in memory 113 and for further processing and usage by the processor 109.

At block 303, the processor of the monitoring and control system 107 determines variation of hook load between the predetermined intervals using the hook load data. The hook load data obtained by the monitoring and control system 107 at block 301 is used herein to determine the variation of hook load or temporal variation of hook load. The variation of hook load or temporal variation of hook load is determined by comparing and computing the difference of the current real time hook load data with that of the previous real time hook load data with corresponding time intervals.

Figure 5:
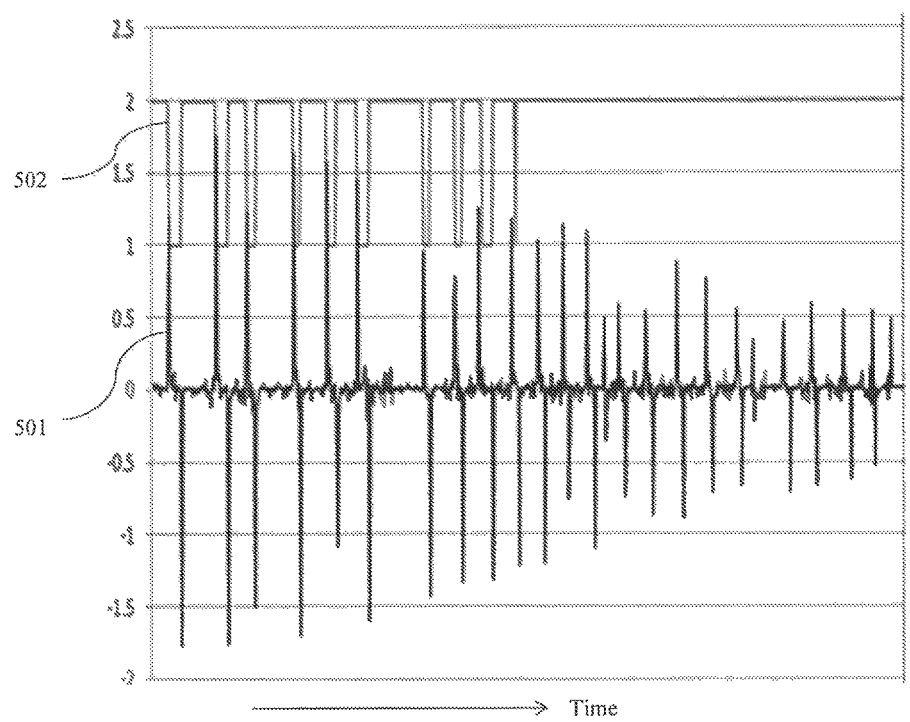
FIG. 5 is an exemplary graphical representation of the variation of hook load with respect to time for a typical trip out job during drilling operation, in accordance with some embodiments of the present disclosure.

Further, as shown in FIG. 5, variation of hook load or temporal variation of hook load (TVHL) against time for a typical trip out job is plotted. In FIG. 5, pre-configured slip status is also plotted. Curve 501 represents TVHL (dHL/dT) values while curve 502 represents preconfigured threshold hook load slip status values. Y-Axis of this plot represents magnitude and direction of TVHL.

It also represents preconfigured threshold hook load slip status values (1=out of slip and 2=in slips). TVHL peaks in curve 501 of FIG. 5 with magnitude greater than 0.3 (both positive and negative) are TVHL spikes in this scenario which represent TVHL slip status change while values less than 0.3 in curve 501 of FIG. 5 represent noise due to hook movement or sensor signal fluctuations etc. While positive TVHL spike represents slip status change from in to out of slips, a negative TVHL spike represents slip status change from out to in slips. In the latter half time of plotted trip out job, while preconfigured threshold hook load slip status values are static (preconfigured threshold hook load slip status=2=in slip), both positive and negative TVHL spikes are obtained indicating actual several string slip status changes.

At block 305, the monitoring and control system 107 determines slip status of the drill string. As can be seen in the plot, the temporal variation of hook load has significant noise and this is to be eliminated to get accurate slip status of the drill string and thus improve the drilling operational efficiency. Therefore to determine slip status of the drill string and eliminate noise, the monitoring and control system 107 determines threshold value of noise. The term threshold value of noise used herein above and below refers to a minimum noise value which is generated during the drilling operation by the drill collar. The threshold value of noise is determined using rig specific predetermined parameters. These parameters include but are not limited to drill collar stand weight, data recording time interval, spike limit and the related factors like drill collar stand weight factor, data recording time interval factor. The rig specific predetermined parameters are obtained by the monitoring and control system 107 from the data acquisition module 103 which in turn obtains these data from the one or more sensors 101. Similarly, the threshold value of noise for different rigs can be obtained. Once the threshold value of noise of the drill string is determined, the monitoring and control system 107 determines magnitude and direction of the temporal variation of hook load data using the predetermined parameters. Further, the threshold value of noise and magnitude of temporal variation of hook load is compared to determine the slip status of the drill string. The slip status of the drill string is determined corresponding to each of the variation of hook load or corresponding temporal variation of hook load. In an embodiment, the slip status of the drill string is either '1—out of slips' or '2—in the slips'. Furthermore, at this block, temporal variation of hook load spike is filtered out from the temporal variation of hook load curve and a slip status is assigned to each spike. It also implies that noise due to hook movement is filtered out.

At block 307 and 309, the determined slip status of the drill string is verified and corrected to get accurate slip status of the drill string and thereby improve the drilling operational efficiency.

In an embodiment, the monitoring and control system 107 assess the accuracy of the determined slip status by verifying the slip status using one or more predetermined conditions. In an embodiment, the one or more predetermined conditions include but are not limited to slip status toggle condition, high threshold value of noise while releasing drill string from slips, high threshold value of noise while putting drill string on slips, low threshold value of noise while tripping, bit is on bottom of borehole, bit is on surface, and over pull due to stuck pipe and pack off conditions. Upon verification of the predetermined conditions, if it is required to achieve better accuracy, then the monitoring and control system 107 performs correction on the rig specific predetermined parameters. The correction is performed using one or more correction factors based on the verification of predetermined conditions. This enables better filtering of temporal variation of hook load spikes from the temporal variation of hook load noise.

In an embodiment, the corrected rig specific predetermined parameters are then transmitted to the data acquisition module 103 for further processing. Further, to improve the drilling operational efficiency, a visualization layer (not shown) connected to monitoring and control system 107 produces accurate real time graphs and visual display of data. Hook load, temporal variation of hook load slip status and other real time drilling operational data are shown as digital values and plotted in graphic formats. Using a WITSML (Wellsite information transfer standard markup language) protocol and secure V sat satellite communication technology, real time hook load, temporal variation of hook load slip status, accurate bit depth and other improved real time drilling operational data are transmitted to a town database. This accurate real time data is then used in various workflows which enable better data quality at real time operational centre support to drilling operations, Business intelligence, key performance indicator generation and for predictive analytics for better drilling hazard prediction and mitigation.

Figure 4:
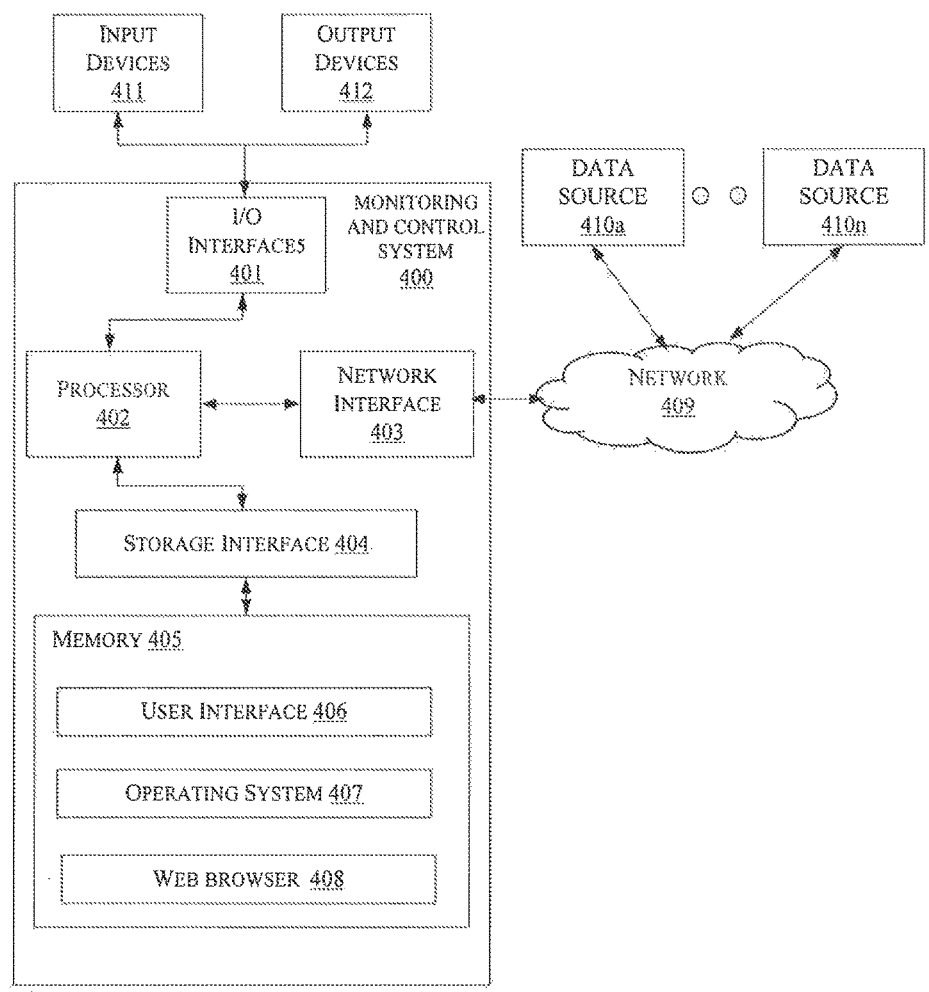
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the monitoring and control system 400 is used for determining slip status of a drill string. The monitoring and control system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the monitoring and control system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the monitoring and control system 400 may communicate with one or more data sources 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more data sources 410 (a, . . . , n) may include, without limitation, personal computer(s), mobile devices such as cellular telephones, smartphones, tablet computers, eBook readers, laptop computers, notebooks, gaming consoles, or the like.

In an embodiment of the disclosure, the one or more data sources 410 (a, . . . , n) is one or more sensors 101. Hence, herein above and below one or more data sources 410 (a, . . . , n) and one or more sensors 101 maybe used alternatively and the same should not be construed as any form of limitation to the disclosure.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, monitoring and control system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the monitoring and control system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the monitoring and control system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the monitoring and control system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the monitoring and control system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the monitoring and control system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method and a system for determining slip status of the drill string.

The present disclosure provides a method and system wherein the accuracy of determination of slip status is improved by filtering out noise component of hook load value changes due to hook movement.

The present disclosure provides a method and system wherein the accuracy of temporal variation of hook load spikes is improved by filtering out noise component of hook load value changes due to over pull, differential sticking, etc. With the improvement in accuracy of temporal variation of hook load spikes, the accuracy of determination of slip status improves.

The present disclosure provides a method and system to determine accurate slip status of the drill string when bit is close to bottom of bore hole, at the end of trip in job or at the beginning of trip out job. This enables filtering of temporal variation of hook load spikes from noise in this scenario.

A description of an embodiment with several components in communication with each other does not imply that all such components are required. On the contrary a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for determining slip status of the drill string. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Architecture |
| 101 | One or more sensors |
| 103 | Data Acquisition Module (DAM) |

| Reference Number | Description |
| --- | --- |
| 105 | Communication network |
| 107 | Monitoring and Control System |
| 109 | Processor |
| 111 | I/O interface |
| 113 | Memory |
| 201 | Data |
| 203 | Hook load data |
| 205 | Rig specific predetermined data |
| 207 | Real time drilling operational data |
| 219 | Other data |
| 209 | Modules |
| 211 | Receiving module |
| 213 | Hook load variation determining module |
| 215 | Slip status determining module |
| 217 | Verification and Correction module |
| 219 | Other modules |
| 301, 303, 305, 307 and 309 | Steps in flow chart |
| 400 | Monitoring and control system |
| 401 | I/O interfaces |
| 402 | Processor |
| 403 | Network interface |
| 404 | Storage interface |
| 405 | Memory |
| 406 | User interface |
| 407 | Operating system |
| 408 | Web browser |
| 409 | Network |
| 410 | Data Source/Sensors |
| 411 | Input devices |
| 412 | Output devices |
| 501 | Curve representing Temporal Variation of Hook Load (TVHL) values |
| 502 | Curve representing Pre-Configured Threshold Hook Load (PCTHL) slip status values |

I claim:

1. A method for determining slip status of a drill string, the method comprising:
obtaining, by a monitoring and control system, a hook load data at predetermined time intervals;
determining, by the monitoring and control system, variation of hook load between the predetermined time intervals using the hook load data;
determining, by the monitoring and control system, a slip status of the drill string corresponding to each of the variation of hook load by comparing each of the variation of hook load with a threshold value of noise in the drill string, wherein the threshold value of noise in the drill string is determined based on predetermined parameters of the drill string;
verifying, by the monitoring and control system, the slip status of the drill string corresponding to each of the variation of hook load using one or more predetermined conditions; and
correcting, by the monitoring and control system, the slip status of the drill string corresponding to each of the variation of hook load by adjusting predetermined parameters, based on verification of the one or more predetermined conditions.

2. The method as claimed in claim 1, wherein the one or more pre-determined conditions include slip status toggle condition, high threshold value of noise while releasing drill string from slips, high threshold value of noise while putting drill string on slips, low threshold value of noise while tripping, bit is on bottom of borehole, bit is on surface, and over pull due to stuck pipe and pack off conditions.

3. The method as claimed in claim 1, wherein adjusting the predetermined parameters includes:
computing one or more correction factors; and
computing the predetermined parameters using the one or more correction factors.

4. The method as claimed in claim 1, wherein the hook load data and the predetermined parameters are stored in a data acquisition module.

5. The method as claimed in claim 1, wherein the predetermined parameters include drill collar stand weight, data recording time interval, drill collar stand weight factor, and data recording time interval factor.

6. The method as claimed in claim 1, wherein the slip status is a value indicating one of in-slip and out-of-slip condition of the drill string.

7. The method as claimed in claim 1, wherein the variation of hook load is determined based on the hook load data obtained at current time interval of the predetermined time intervals and the hook load data obtained at a previous time interval of the predetermined time intervals.

8. The method as claimed in claim 1, wherein the slip status of the drill string corresponding to each of the variation of hook load is determined by comparing magnitude and direction of each of the variation of hook load with the threshold value of noise.

9. A monitoring and control system for determining slip status of a drill string, the monitoring and control system comprising:
a processor; and
a memory communicatively coupled to the processor, wherein the memory stores the processor-executable instructions, which, on execution, causes the processor to:
obtain a hook load data at predetermined time intervals;
determine variation of hook load between the predetermined time intervals using the hook load data;
determine a slip status of the drill string corresponding to each of the variation of hook load by comparing each of the variation of hook load with a threshold value of noise, wherein the threshold value of noise in the drill string is determined based on predetermined parameters of the drill string;
verify the slip status of the drill string corresponding to each of the variation of hook load based on one or more predetermined conditions; and
correct the slip status of the drill string corresponding to each of the variation of hook load by adjusting predetermined parameters, based on verification of one or more predetermined conditions.

10. The monitoring and control system as claimed in 9 is communicatively coupled to a data acquisition module associated with one or more sensors on the drill string.

11. The monitoring and control system as claimed in claim 10, wherein the data acquisition module is configured to convert electronic signals received from the one or more sensors into digital signals.

12. A non-transitory computer-readable medium storing instructions for determining slip status of a drill string, wherein upon execution of the instructions by one or more processors, the processors perform operations comprising:
obtaining a hook load data at predetermined time intervals;
determining variation of hook load between the predetermined time intervals using the hook load data;
determining a slip status of the drill string corresponding to each of the variation of hook load by comparing each of the variation of hook load with a threshold value of noise in the drill string, wherein the threshold value of noise in the drill string is determined based on predetermined parameters of the drill string;

verifying the slip status of the drill string corresponding to each of the variation of hook load using one or more predetermined conditions; and correcting the slip status of the drill string corresponding to each of the variation of hook load by adjusting predetermined parameters, based on verification of the one or more predetermined conditions.

13. The medium of claim 12, wherein the one or more pre-determined conditions include slip status toggle condition, high threshold value of noise while releasing drill string from slips, high threshold value of noise while putting drill string on slips, low threshold value of noise while tripping, bit is on bottom of borehole, bit is on surface, and over pull due to stuck pipe and pack off conditions.

14. The medium of claim 12, wherein adjusting the predetermined parameters includes:

computing one or more correction factors; and computing the predetermined parameters using the one or more correction factors.

* * * * *